US006812476B1

(12) United States Patent
Alexandre

(10) Patent No.: US 6,812,476 B1
(45) Date of Patent: Nov. 2, 2004

(54) ELECTRONIC SYSTEM OPERATING UNDER IRRADIATION, PROCESS FOR DESIGNING SUCH A SYSTEM AND APPLICATION THEREOF TO THE CONTROL OF A MOBILE ROBOT

(75) Inventor: Jean-Marc Alexandre, Amtomy (FR)

(73) Assignee: Commissariat a l'Energie Atomique, Paris (FR)

(*) Notice: Subject to any disclaimer, the term of this patent is extended or adjusted under 35 U.S.C. 154(b) by 0 days.

(21) Appl. No.: 09/512,943

(22) Filed: Feb. 25, 2000

(30) Foreign Application Priority Data

Feb. 26, 1999 (FR) ............................................ 99 02419

(51) Int. Cl.[7] ............................................ G02B 27/00

(52) U.S. Cl. ............................... 250/515.1; 250/517.1; 250/526

(58) Field of Search .......................... 250/515.1, 517.1, 250/526, 200

(56) References Cited

U.S. PATENT DOCUMENTS 3,774,866 A * 11/1973 Madden ...................... 244/3.2
4,977,329 A * 12/1990 Eckhardt et al. ............ 250/551
5,294,826 A * 3/1994 Marcantonio et al. ....... 257/659
5,444,254 A * 8/1995 Thomson ............... 250/370.07
5,497,495 A * 3/1996 Ishikawa et al. ............ 361/716
5,561,265 A * 10/1996 Livshits et al. ........ 174/35 GC
5,635,754 A * 6/1997 Strobel et al. .............. 257/659
5,639,989 A * 6/1997 Higgins, III ........... 174/35 MS
5,808,866 A * 9/1998 Porter ........................ 361/695
5,821,604 A * 10/1998 Egawa ....................... 257/659
5,953,206 A * 9/1999 Jondrow ..................... 361/687
5,965,872 A * 10/1999 Endo et al. .............. 250/208.1
6,011,299 A * 1/2000 Brench ....................... 257/660
6,042,267 A * 3/2000 Muraki et al. .............. 378/169
6,164,987 A * 12/2000 Mirabella et al. ............. 438/98
6,262,363 B1 * 7/2001 Bortolini et al. .......... 174/35 R
6,390,672 B1 * 5/2002 Vail et al. ................... 374/170

FOREIGN PATENT DOCUMENTS

EP 0 461 982 A1 6/1991
EP 0 884 818 A1 12/1998
FR 2 421 493 3/1978
FR 2 765 342 6/1997
GB 2 279 780 A 1/1995

* cited by examiner

*Primary Examiner*—John R. Lee
*Assistant Examiner*—Anthony Quash
(74) *Attorney, Agent, or Firm*—Pearne & Gordon LLP

(57) ABSTRACT

The present invention relates to an electronic system operating under irradiation and to a process for designing such a system making it possible to determine a first group (21) of components with high integration and vulnerability intended to be selectively protected by a shield (22), the remainder of the components (20) not benefiting from such a protection.

One application of the process is for an electronic control system of a mobile robot able to function in the presence of ionizing radiation (typically gamma radiation).

11 Claims, 7 Drawing Sheets

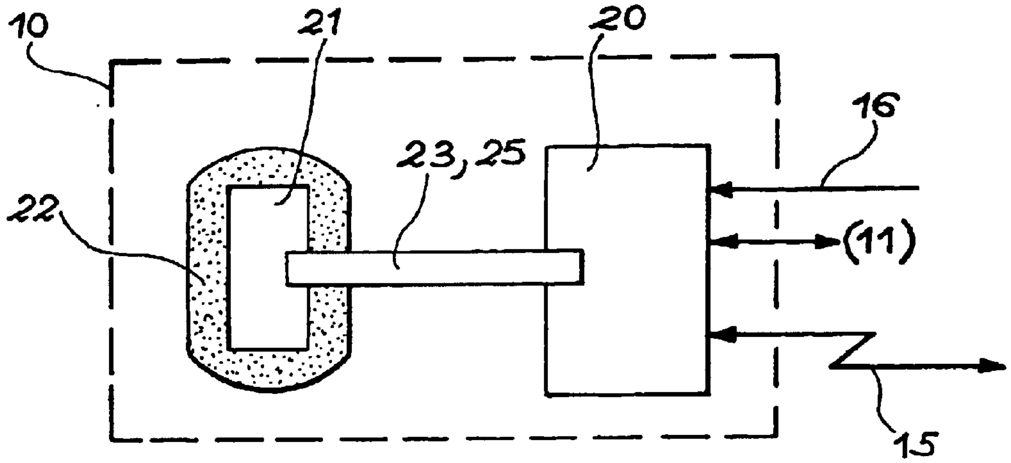
FIG. 2
FIG. 8
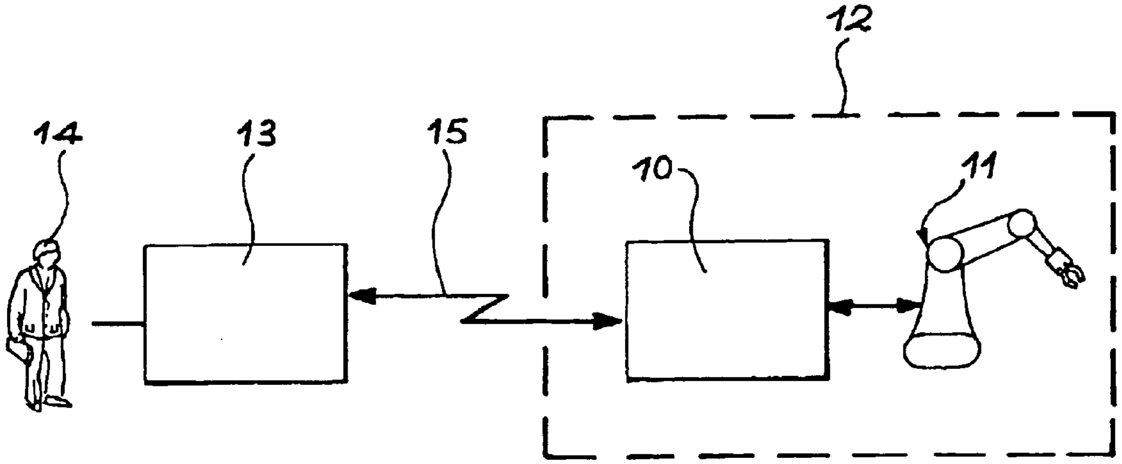

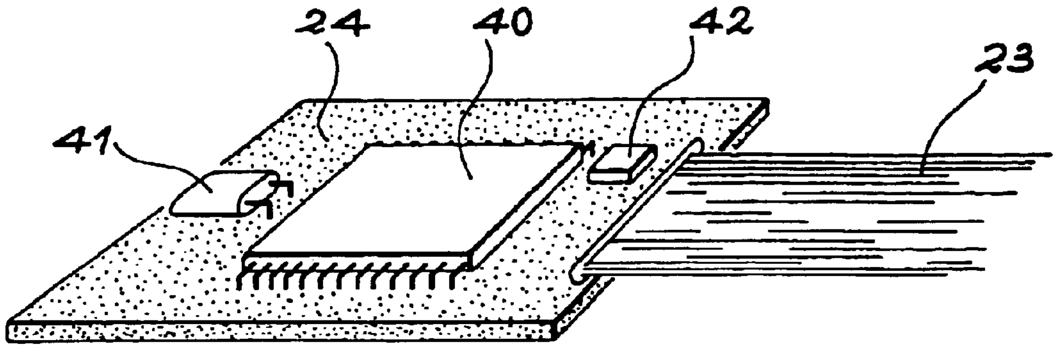
FIG. 4A
FIG. 4B
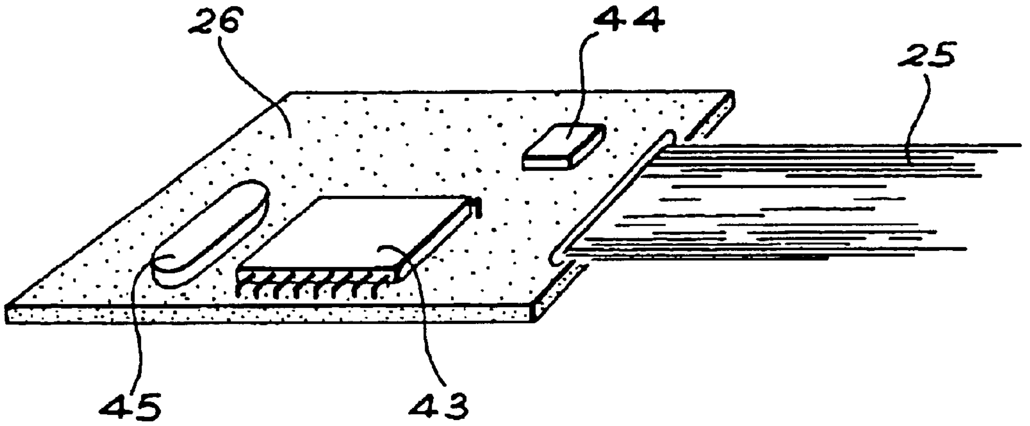

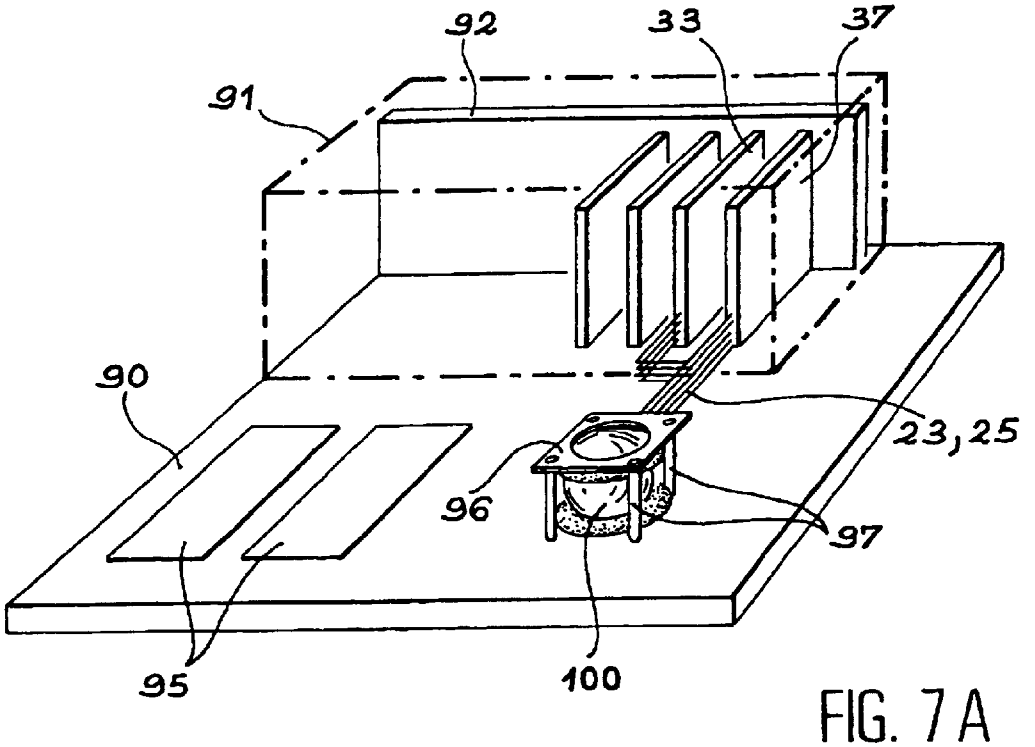
FIG. 7A
FIG. 7B
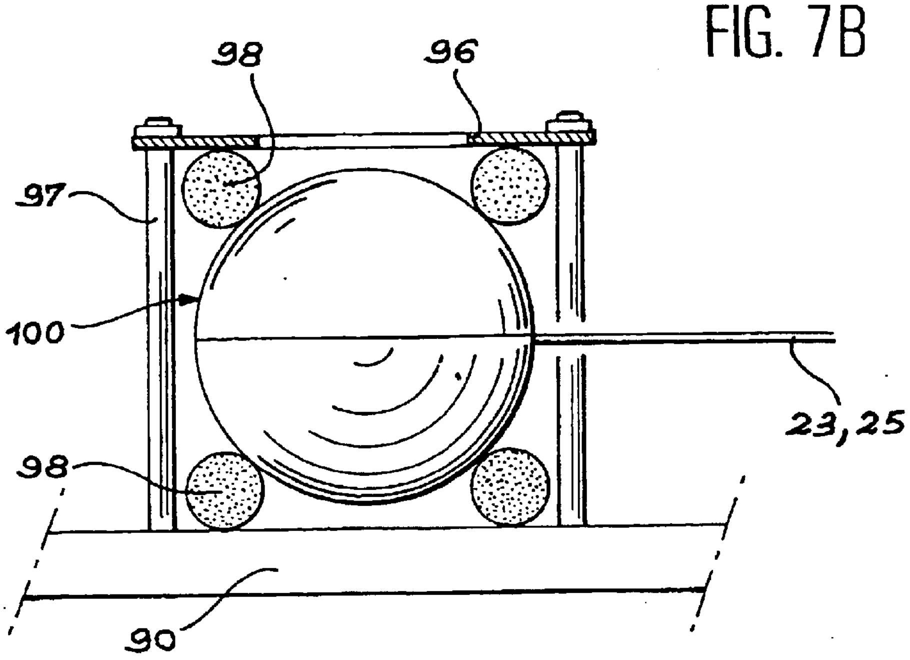

ELECTRONIC SYSTEM OPERATING UNDER IRRADIATION, PROCESS FOR DESIGNING SUCH A SYSTEM AND APPLICATION THEREOF TO THE CONTROL OF A MOBILE ROBOT

TECHNICAL FIELD

The present invention relates to an electronic system operating under irradiation, particularly X or gamma radiation, a process for designing such a system intended to make said system function under irradiation whilst incorporating "vulnerable" components, i.e. intrinsically unfit to operate under said irradiation, and the application of said process to the control of a mobile robot.

Although the legal unit of measurement for radiation doses integrated by components is the Gray (Gy), the experts and most reference documents express this magnitude in the old unit, i.e. the Rad. Hereinafter use will consequently be made of said second unit. It is pointed out that 100 Rad=1 Gy.

The term "vulnerable" circuits is understood to mean electronic circuits only able to understand one or a few hundred kRad, typically in the form of gamma or neutron radiation, such as are encountered in nuclear engineering. In general, such circuits have a very large scale integration (VLSI) and are based on CMOS technology, although these features are not limitative.

These "vulnerable" circuits are the only ones able to implement very complex functions. Examples are microcontrollers, digital signal processors, application specific integrated circuits (ASICs) or bulk memories. They are particularly appropriate for the implementation of control systems carried by high technology remote manipulators or on mobile robots.

Thus, the invention is mainly directed at the design of control systems for a nuclear environment, which are at present the highest performance electronic systems working in such an environment. Consequently they are used as the example for the description of a preferred embodiment. However, it does not pass beyond the scope of the invention to apply same to any other electronic system, provided that its complexity makes it advantageous to use components which are "vulnerable" to ambient irradiation.

The term "control system" is not considered here in the very restricted sense often used in nuclear engineering, notably due to the very rudimentary performance characteristics authorized in the prior art and whereof a few examples will be given hereinafter. Subsequently the term control system is used in a broader sense in that its function is to collect informations on the system to be controlled, process them if necessary (e.g. by digital filtering/non-linearity correction), apply thereto one or more digital control laws which can include autonomous operating modes able to take decisions, manage the controls of power amplifiers associated with actuators, ensure safety functions and, in the case of a partial failure, manage degraded operating modes. Such a control may also be able to communicate with an information transmission device, as a function of the possibilities of various working configurations (multiplexing, microwave transmission or any other means).

PRIOR ART

In the prior art, electronic systems operating under such an irradiation and incorporating such vulnerable components are essentially control systems for mobile robots or teleoperated equipment or machines. They can be subdivided into two categories, as a function of the radiation dose which they are able to withstand.

A first category includes control systems which can correspond to the above definition, but which in practice are unable to withstand more than a few kRad and in exceptional cases a few dozen kRad.

Reference can e.g. be made to the Andros mobile intervention robot designed by Remotech, USA. The electronics carried consist of a standard controller constituted by a microcontroller card and variators available in commerce. The controls are transmitted by an umbilical cord. The control system is conventional, close to industrial-type controls, but its radiation resistance or hardness does not exceed 1 to 10 kRad.

A second category covers very simplified control systems unable to comply with the above definition, but able to withstand several dozen kRad or even several hundred kRad when containing virtually no electronics and when their control is displaced to the end of a wire-to-wire link.

An example is constituted by the Oscar mobile intervention robot for which all the control signals are transmitted wire-to-wire by an umbilical cord having a large diameter compared with the robot dimensions and whose length is necessarily limited.

Another example is constituted by the assisted RD 500 remote manipulator used on the La Hague site in the 1990's. All the control signals are transmitted wire-to-wire by an umbilical cord and the actual control is displaced into a non-irradiated area.

More generally, this second category of highly simplified control systems is solely directed at:

- acquiring one or several measurements,
- optionally processing them in rudimentary manner by simple analog filtering (of the first order) or in the best possible case by digitization under 8 bits with long conversion times (exceeding 10 $\mu$s),
- transmitting said measurement or measurements in accordance with a fixed sequential protocol, when not directly wire-to-wire, which then raises the problem of an umbilical cord which is prejudicial as a result of its diameter, weight or its very existence (it makes it impossible to pass through an air lock),
- supply directives to power amplifiers which do not really belong to the control system.

The systems of said second category cannot implement high performance, evolved functions and cannot be autonomous and reliable, reliability assuming the existence of degraded modes or redundancies, as well as the capacity to operate autonomously.

At present there is no solution making it possible for such a control system to operate under irradiation. The proof is supplied by document [3], which mentions the project concerning a mobile robot intended to intervene on the Chernobyl site. The specification required a resistance or hardness to 1 MRad and the solution adopted corresponds to said second above category in its most rudimentary form, i.e. complete absence of carried electronics, all the electronics being effected wire-to-wire by an umbilical cord.

The response of the expert is described in document [4], chapter 4, devoted to the design strategy. It only offers four solutions:

A—the shielding of components or equipment,

B—the choice of the location of the equipment,

C—the use of equipment able to withstand radiation and already commercially available, D—the development of equipment able to withstand radiation.

In practice, it is usually limited to shielding or an offset location of the electronics. Each of the solutions will be examined below.

Solution A, regarding shielding:

Certain components have a box or case designed to resist ionizing radiation. However, it is a lightweight shield against single event upsets (SEUs) encountered by satellites, which are accidental collisions with extremely high energy particles, which can give rise to the local destruction of a microcomponent. They only have a very limited effectiveness against gamma radiation even when reinforced by a supplementary metal screen, because the cumulative gamma radiation dose which can be withstood by a satellite is relatively low (approximately 100 kRad for its entire life) and does not constitute an aim for the designer. The expert knows that despite the common reference made to "ionizing radiation", it is in fact a different problem to those encountered in the nuclear industry.

In the nuclear industry, the shield against ionizing radiation is constituted by a thick, heavy metal covering (e.g. of lead or Dénal for gamma radiation), because the attenuation provided by said shield is dependent on the atomic mass of the material. Attenuation curves show that the thickness must exceed several centimeters to ensure that the shield has any significance and this thickness increases very rapidly on increasing the admissible radiation dose. Thus, for lead shielding the controls of a gantry operating on a French industrial site (managed by an industrial controller), it was necessary to use an approximately one lead tonne shield, which required a costly overdimensioning of the gantry structure. This shield was designed to enable the controls to withstand 1 MRad. In addition, it was necessary to replace the controls every year, making it necessary to immobile the installation, which was so expensive that the operator decided to abandon this solution and install a control displaced into the non-irradiated area and with a wire-to-wire link.

This shielding solution, which appears too weighty for a heavy equipment, would suffer from this disadvantage to an even greater extent for a mobile equipment, whose weight is always critical, particularly if it is required to ascend a walkway staircase in order to intervene in a nuclear power station following a possible technical incident. Apart from its direct effect, the weight of a shield also represents a problem which cannot be circumvented on examining the potential energy involved during an impact, fall or descent of a step. Thus, e.g. for a shield weighing one tonne, which was shown hereinbefore to be inadequate, if the mobile equipment suddenly descends a 10 cm step and the corresponding energy mgh is absorbed by an elastic device of rigidity k, crushing 1 cm, it is possible to write: $mgh=\frac{1}{2}Fx$, where $F=kx$, with $x=10^{-2}$ m and $h=10^{-1}$ m, then: $F=2.10^{8}$ N, which corresponds to an acceleration of $2.10^{5}$ g.

It is clear that the suspension of such a mass (control system and shield) placed on a moving equipment becomes an insoluble problem.

Solution B, concerning the offset location of the electronics:

By definition, it is in contradiction to the problem set, which consists of making a control system function under irradiation.

Solution C, using equipment able to withstand radiation and commercially available:

By definition, it is contrary to the set problem, which consists of making a true control system operate under irradiation, whereas commercially available systems are much too rudimentary to satisfy the set problem.

Solution D, aiming at designing a hardened control system:

Hardening essentially consists of replacing MOS circuits with their equivalents, when they exist, in hardened technology (SOS, SOI, DMILL, etc.). However, the SOS, SOI and DMILL technologies are not widely commercially used, so that there is only a limited range of available components, both with regards to diversity of products and with regards to performance characteristics. For example in the case of microcontrollers, the presently available hardened products have functionalities and performance characteristics corresponding to a technological time lag of roughly 20 years compared with unhardened products. They have no random access memory and their functionality and instruction sets are difficultly compatible with a control system of the type defined hereinbefore. Their irradiation resistance is approximately 300 kRad, namely an improvement by a factor of approximately 10 compared with a standard component and a little higher compared with a particularly vulnerable model. However, DMILL technology admittedly makes it possible to reach 10 MRad. However, it does not make it possible to implement rewritable memories. In addition, the commercial availability is extremely limited and, for its implementation, requires the development of ASICs, which imposes constraints incompatible in practice with the implementation of a mobile robot control.

Hardening of the electronics becomes increasingly difficult when the irradiation dose to be withstood increases. Moreover, as shown by document [5], on passing a threshold of approximately 1 kRad (low conventional electronics limit under irradiation), the cost of hardening increases with the dose rate in proportions not making it possible to reach or exceed 1 MRad.

To conclude, existing control systems only offer rudimentary functions, performed at low speed, without any possibility of significantly improving their performance characteristics or reliability. The acquisition rate for information from sensors is so low that it prevents any force return possibility, which would be indispensable for the performance of certain teleoperation tasks.

The autonomy level given by such controls is very low and really teleoperated systems are involved. However, nuclear applications cannot make do with teleoperation. A radiocontrolled machine must e.g. be able to take an autonomous decision in the case of a transmission problem (e.g. return to the position preceding communication loss). Another well known example consists of introducing via a lock a mobile robot into a nuclear power station following an incident which has led to a leak of nuclear material within the building. It is known how a robot can be introduced, but the respecting of the necessary sealing prevents transmitting controls to it by cable. Thus, it is vital that the robot can move autonomously to one of these points, which cannot be achieved at present.

This prior art can be summarized on the basis of the recent design project for a Pioneer mobile robot for intervention on the Chernobyl site. The specification required the withstanding of a cumulative dose of 1 MRad. No industry or research laboratory was able to propose a carried control system complying with this requirement. In the device at present being studied, all the directives are supplied wire-to-wire to an offset control station.

The present invention relates to an electronic system operating under irradiation, particularly X or gamma radiation, a process for designing such a system and its preferred application to a control system of a mobile robot operating under said irradiation.

DESCRIPTION OF THE INVENTION

The present invention relates to a process for designing electronic systems able to operate under irradiation and comprising the following stages:

I. Enumerating all the functions to be implemented by the system;

II. determining the electronic components able to physically implement these functions, whilst giving preference to models having the larger scale integration;

III. determining the volume of components which can be protected by protection means referred to as shielding, whilst taking account of the radiation dose to be withstood by the system, the maximum permitted weight of the material chosen for said shielding, as well as the distance at which components selectively protected by said shielding could be from other, unshielded components;

IV. establishing a list of the most vulnerable components, whilst firstly taking account of their technology, then their degree of integration, whilst associating with each of these components the components which have to be installed in their immediate vicinity, if existing, and whilst firstly positioning the most vulnerable component, then that whose vulnerability is slightly less high and so on, optionally placing several identical vulnerability circuits;

V. selecting on the basis of the list of the preceding stage, a group of components, commencing with the most vulnerable components and limiting said group to components which, by their very dimensions, can be installed in the volume defined in stage III;

VI. examining whether the components in said system can implement coherent functions and only communicate with the remainder of the system by a reasonable number of wires, which transmit signals able to pass through without deterioration the distance stipulated in stage III between the selectively protected components and the other components; if all these conditions are not simultaneously fulfilled, modifying by iteration the list of components in order to obtain this result, but without exceeding the volume defined in stage III; if all these conditions are simultaneously fulfilled pass to the following stage, the group of components obtained in this way being called the "first group of first components" and the other components being called the "second group of second components";

VII. designing the physical installation of the first group of first components, designing the shielding, constituted by at least one radiation-absorbing material, positioned around said first group of components, and designing between the first group of components and the second, connection means arranged so as not to form a penetration path for ambient radiation;

VIII. designing the physical installation of the second group of components, evaluating the radiation dose which they have to withstand and, if necessary, using a complimentary procedure for improving their suitability for operating under irradiation by a technique other than shielding;

IX. evaluating whether the solution to the problem set is or is not obtained: if it is not obtained, modifying the parameters of stage III (weight and nature of the shielding material, maximum acceptable irradiation dose, distance between the first group of components and the second) and repeating the procedure as from stage III; if it is obtained consider that the purely designed part is completed in a satisfactory manner and optionally start the experimental part of stage X;

X. validate the design by producing a prototype in accordance with the above design stages, at least with regards to the first group of components, put into place in the protection means (shielding thereof) and carry out irradiation tests; if said tests are not in accordance with the specifications, modify the parameters of stage III (weight and nature of the shielding material or optionally the maximum acceptable irradiation dose) and repeat the procedure as from stage III, stage X being optional.

It does not pass outside the scope of the present invention to perform certain stages implicitly and in a more or less simultaneous manner, but in fact fulfilling the same function. This is particularly the case with stages IV, V and VI which a skilled person can carry out "at his discretion" without necessarily breaking down his work into elementary steps, as has been done here for clarity reasons. It also does not involve passing outside the scope of the invention not to perform stage X.

Stage II, which leads to preferably choosing operationally very rich circuits, has the consequence of limiting the functionalities to be ensured by the other components of the system. This facilitates recourse to techniques other than shielding for ensuring their protection.

Stage III involves the parameters concerning the dimensioning of the protection. The actual shielding or shield is implemented in accordance with the prior art, particularly with regards to the material, which must be adapted to the nature of the considered radiation.

Stage IV mentions a list of the most vulnerable components, whilst taking account of their technology and then their degree of integration. A skilled person or a person making use of information from the designer can draw up a first hierarchy in the aptitude of the components to withstand a certain radiation dose. However, operating in a stringent manner and taking account of behavioural differences of the circuits as a function of the energy of the radiation, the intensity thereof and the distribution thereof in time, it is particularly advantageous to perform tests.

Stage V defines components which are to be selectively protected, namely high performance and function-rich components for which it is impossible to find in conventional industrial ranges radiation-resistant equivalents. The standard example is a VLSI CMOS technology microcontroller having on a single semiconductor chip a central processing unit, memories, inputs/outputs, watchdog, etc. Of the list of the preceding paragraph only those components are retained, starting with the most vulnerable, which can be installed in the volume defined in paragraph III. Components which have to be physically very close to these components, such as the watch quartz of a microcontroller or bypass capacitor or capacitors, are associated therewith and are a priori retained in the same way. However, it does not pass outside the scope of the invention to decide not to protect these auxiliary components.

If it is vital to protect more components than the shield can contain, two other possibilities exist which can be implemented in accordance with the invention:

- combining these components by implantation or "hybridization" (compact fitting of electronic chips) in order to protect them by a single shield,
- allocating to the radiation protection several shields containing selectively protected components.

Difficulties can arise in removing the heat generated by the operation of these components. In this case, it does not pass outside the scope of the invention to incorporate between said components and the shield an electrically insulating, but thermally conductive product in order to remove the heat through the shield.

Stage VI constitutes a validation of the components selected in the preceding stage, whilst envisaging the constraints linked with the operation of the electronics, particularly the number and passband of the signals which flow between the components to be selectively protected by shielding and those which are not protected. Nevertheless, the aim for said second components is to improve their tolerance to radiation by any procedure other than shielding (see stage VIII).

Stage VII involves the production of protection means or shielding. A preferred implementation of the shield is constituted by two half-shells joined together by screws arranged in such a way as to minimize the effect thereof on the protection of the components. The connections with the second group of components can advantageously take place by a flexible printed circuit, which follows a baffle equipping the shield at its input/output, in order to avoid radiation penetration.

In an advantageous embodiment said shield is connected to the remainder of the system:

- mechanically by a cushioning suspension,
- electrically by connections which are sufficiently flexible to take account of the displacements due to this mechanical suspension.

Stage VIII refers to protection methods other than shielding, e.g. processes for managing the operation of these components by redundancies and/or optimization of supply voltages as described in documents [1] and [2], making it possible to significantly extend their life. Another example is the use of action concatenation timing diagrams (particularly with respect to the logic system), whose time ranges are sufficiently wide to make their operation tolerant with respect to time drifts which can be caused by irradiation.

BRIEF DESCRIPTION OF THE DRAWINGS

FIG. 2 diagrammatically shows the electronic system of the invention.

FIGS. 4A and 4B show an installation of the group of first components.

FIGS. 7A and 7B illustrate a mechanical embodiment of the invention, FIG. 7A showing the general arrangement and FIG. 7B a mechanical installation of a shock absorber and/or vibration absorber for the shielded part.

FIG. 8 places the control system according to the invention in the overall context of its use.

DETAILED DESCRIPTION OF A SPECIAL EMBODIMENT

In the remainder of the description consideration will be given in exemplified manner to a preferred application of the invention constituted by a control system for a mobile robot able to operate in an irradiated medium and having to withstand 1 MRad.

Figure 1:
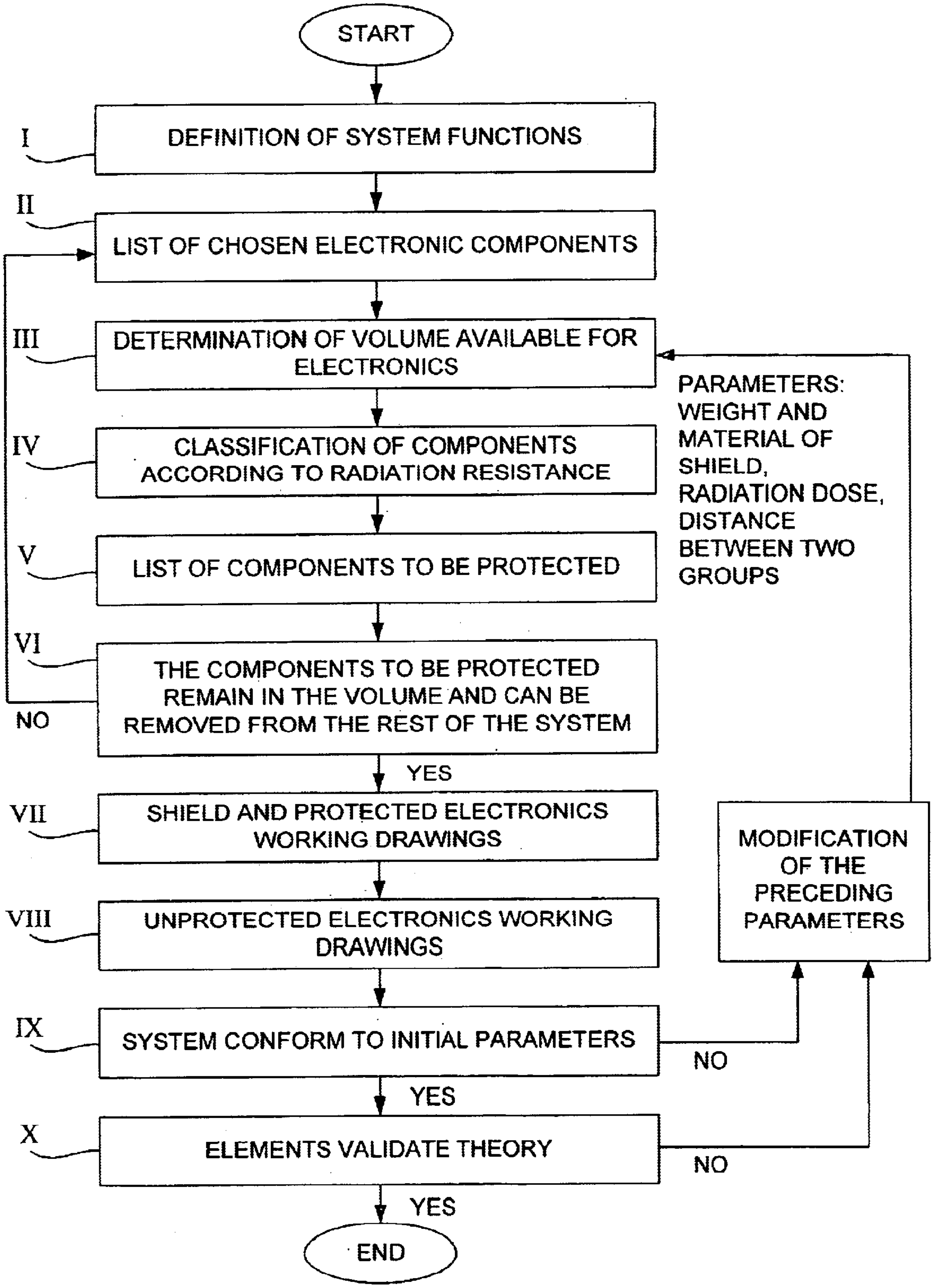
FIG. 1 is a flowchart of the different stages of the process according to the invention.

The application of the process of the invention described hereinafter takes place in accordance with the flowchart of FIG. 1, which reveals the different stages of the design process. If at the end of a first iteration said process leads to a result incompatible with the initial parameters, a second iteration is undertaken following modification of said parametrs.

First Iteration

Stage I—Functions of the Control System

The list of functions to be implemented for the envisaged control comprises the five following families:

- acquisition of sensor measurements and analog or digital processing, e.g.
  - six analog motor current measurements,
  - two analog temperature measurements,
  - one analog battery current measurement,
  - one analog voltage reference measurement,
  - ten relay control conformity discreet inputs,
  - five miscellaneous discreet inputs;
- dispatch of controls, e.g.:
  - six analog motor controls,
  - ten relay control discreet outputs,
  - five auxiliary discreet outputs;
- communication via a "full duplex" series link with the control station:
  - interpretation of the messages received,
  - transmission of messages,
  - checking the conformity of the messages;
- checking the operation of the robot:
  - checking the actions of the robot,
  - interruption of the measurement of the safety sensors,
  - management of the safety modes (thermal, on motor current, measurement drifts);
- degraded or autonomous mode management (communication loss, autonomous actions, etc.).

Stage II—Electronic Components of the System

The functional analysis of the robot controller leads to investigating components incorporating:

- drivers, address decoding, three-state logic,
- analog/digital converter, analog filters, analog amplifiers,
- digital/analog converters,
- discreet logic components, relays.

The choice of the electronic components is oriented towards components having the maximum degree of integration, namely:

- a controller 40 (incorporating the processor, a code memory, a random access memory (RAM), a universal asynchronous receiver transmitter (UART) circuit, a bus manager, a watchdog and high calculating speed performance characteristics,
- an analog/digital converter 43 (including voltage reference, sample and hold circuit, logic operating in a three-state mode, control signals, high performance characteristics as regards acquisition time and resolution),
- operational amplifiers (filtering and amplification),
- digital/analog converters including a voltage reference,
- TTL logic components (drivers, address decoding, three-state logic, discreet logic components) of the ALS type, passive components, electromechanical relays.

The microcontroller and analog/digital converter are in low consumption, low noise CMOS technology, but this renders them very radiation-fragile. These two components have no insensitive or relatively radiation-insensitive equivalent. As far as possible for other components use is made of bipolar or JFET technology components able to withstand gamma radiation.

The procedure proposed in the process according to the invention runs counter to that of the expert who would use relatively unsophisticated, preferably hardened components. According to the invention very radiation-sensitive functions are carried out (linked with the processor and its peripherals), which do not exist in MOS technology. At best the expert would use hardened technology components (SOI, SOS) for performing these functions. However, there is no industrial, hardened microcontroller having an integration level equivalent to those of conventional CMOS technologies and which could fulfil all these functions. There would then be several consequences:

- the acceptable dose level remains below 300 kRad for most hardened components (imposed by the needs of the space market, without any interest in the nuclear field), which amounts to saying that the set problem could not be solved;
- even with a life not exceeding one third of the specified life, the general performance characteristics of the system would be lower by several orders of magnitude, i.e. ten to more than one hundred times as a function of the considered parameter, namely the processor calculating power, memory size, series link flow rate, processor cycle time and bus speed.

Stage III—Determination of the Available Volume

The following parameters apply for determining the useful volume:

- the maximum permitted weight for the shield, e.g. 10 kg;
- the material, e.g. for the considered gamma radiation Dénal would be chosen, this being a tungsten alloy; in stage III lead and Dénal are envisaged in order to show the interest of Dénal compared with lead, but iteration only takes place with lead in order not to over-burden the description;
- the acceptable radiation dose, e.g. 1 MRad,
- the distance between the two groups of components, e.g. less than 2 dm.

It can be deduced from this that it is possible to protect a volume limited to:

(1=20 mm)×(L=20 mm)×(h=10 mm).

Stage IV—Classification of the Components by Vulnerability

Theoretical knowledge enriched by experience has led to the following list:

- analog/digital converter, 20 kRad,
- microcontroller: approximately 50 kRad,
- digital/analog converter: >1 MRad,
- operational amplifier: >1 MRad,
- TTL logic components: >1 MRad whilst respecting the operating rules (cf. stage VIII),
- passive components: approximately 100 MRad,
- relays: >1 MRad.

Stage V—Components to be Protected

The microcontroller and analog/digital converters must be protected. To these components should be added as auxiliary elements to be installed in their vicinity, a watch quartz and bypass capacitors.

Stage VI—"First Components" Compatible With the Volume Given

The available volume for the protection is not adequate to house the microcontroller and analog/digital converters, even when using hybridization methods.

The process recommences at stage II.

Second Iteration

Stage II—Electronic Components of the System

The number of analog/digital converters is limited to a single component and introduction takes place of an analog multiplexer and a selection logic making it possible to increase the number of analog acquisition channels. This choice is made to the detriment of the total acquisition time of the measurements, but can be compensated by a masked time software acquisition mechanism.

The new list of electronic components is as follows:

- a Siemens microcontroller,
- a digital/analog converter,
- an Analog Devices analog multiplexer,
- operational amplifiers (filtering and amplification),
- six digital/analog converters,
- TTL technology logic components (drivers, address decoding, three-state logic, discreet logic components, selection logic),
- passive components,
- electromechanical relays.

Stage III—Determination of the Available Volume

The result is identical to that of the preceding iteration, namely:

(1=20 mm)×(L=20 mm)×(h=10 mm).

Stage IV—Classification of the Components by Vulnerability

- microcontroller, approximately 50 kRad,
- analog/digital converter: 20 kRad,
- analog multiplexer: >1 MRad,
- digital/analog converter: >1 MRad,
- operational amplifier: >1 MRad,
- TTL logic components: >1 MRad whilst respecting the operating rules,
- passive components: approximately 100 MRad,
- relays: >1 MRad.

Stage V—Components to be Protected

A microcontroller and an analog/digital converter, both encapsulated in accordance with CMS technology, i.e. components for surface installation have associated with them as auxiliary elements a quartz and bypass capacitors. The multiplexer is not included in the protected components.

Stage VI—"First Components" Compatible With the Volume Given

Both the microcontroller and the analog converter are placed on a multilayer printed circuit. Each of these printed circuits is connected to unshielded components by a flexible printed circuit, whose other end is an interface card of an electronic bay.

The signals flowing in the flexible printed circuits are:

- supplies,
- a multiplexed bus for the microcontroller (0–5V, 20 MHz),
- the control signals and data for the converter (0–5V, 20 MHz),
- the analog input signal of the converter (+/−10 V, 300 Hz, max).

The passband and measurement sensitivity permit a displacement of a few decimeters of the first components with respect to the second components.

The shield is formed form two Dénal half-shells, together weighing 10 kg and whose external shape is similar to that of a flattened sphere. The size of the shield is decided whilst establishing the relationship between the dose to be expected (1 MRad) and the resistance under irradiation of the most vulnerable component. The relationship for the control system is a protection factor 50. It is known that 35 mm of lead supply an attenuation factor of 10 for a cobalt 60 irradiation. The same result is obtained with 24 mm of Dénal. Use is made of a quasi-spherical shield weighing 10 kg and a lead radius of 60 mm and a Dénal radius of 42 mm. The latter value makes it possible to guarantee the resistance of the first components to irradiation with a good safety margin.

Stage VII—Implementation of the Protected Group

The first group of first components is installed on two multilayer printed circuits, but the use of a single printed circuit would not fall outside the scope of the invention. Each of these two printed circuits communicates with an interface card belonging to the second group of components.

Stage VIII—Implementation of the Unprotected Group Electronics

This stage uses other procedures for guaranteeing the resistance under irradiation of the unprotected electronics, including:

- action concatenation timing diagrams (at the TTL logic) which are tolerant to time drifts,
- a dynamic operation of the three-state TTL logic managed by the microcontroller in order to minimize the leakage current in the blocked phase,
- a software compensation of the drift under irradiation of the measurement of the analog/digital converter by measuring known reference voltages.

Stage IX—System Conformity

The calculations of stage VI and experience concerning the implementation of the complimentary procedures mentioned in stage VIII make it possible to prove that the system is able to satisfy specifications.

Stage X—Validation Test

The validation tests under irradiation are firstly performed on the first group of first components, equipped with the shielding. This is followed by a test under irradiation of the complete system making it possible to prove the conformity of the complete system.

At the end of the different stages of the process according to the invention illustrated on the flowchart of FIG. 1, the electronic system described hereinafter is e.g. obtained. It is assumed hereinafter that it is a mobile robot control system described as a preferred embodiment.

FIG. 2 illustrates the general architecture of an electronic system 10, which is constituted:

- by an interface system 20 (with several cards), equipped with resistant or hardened or tolerant components,
- by a module 21 having standard industrial components protected by a shield 22 and connected to the interface system 20 by a flexible printed circuit 23, 25,
- by a data series transmission line 15,
- by connections with the robot 11 (controls of motors, information return, sensors),
- a power supply line 16.

Figure 3:
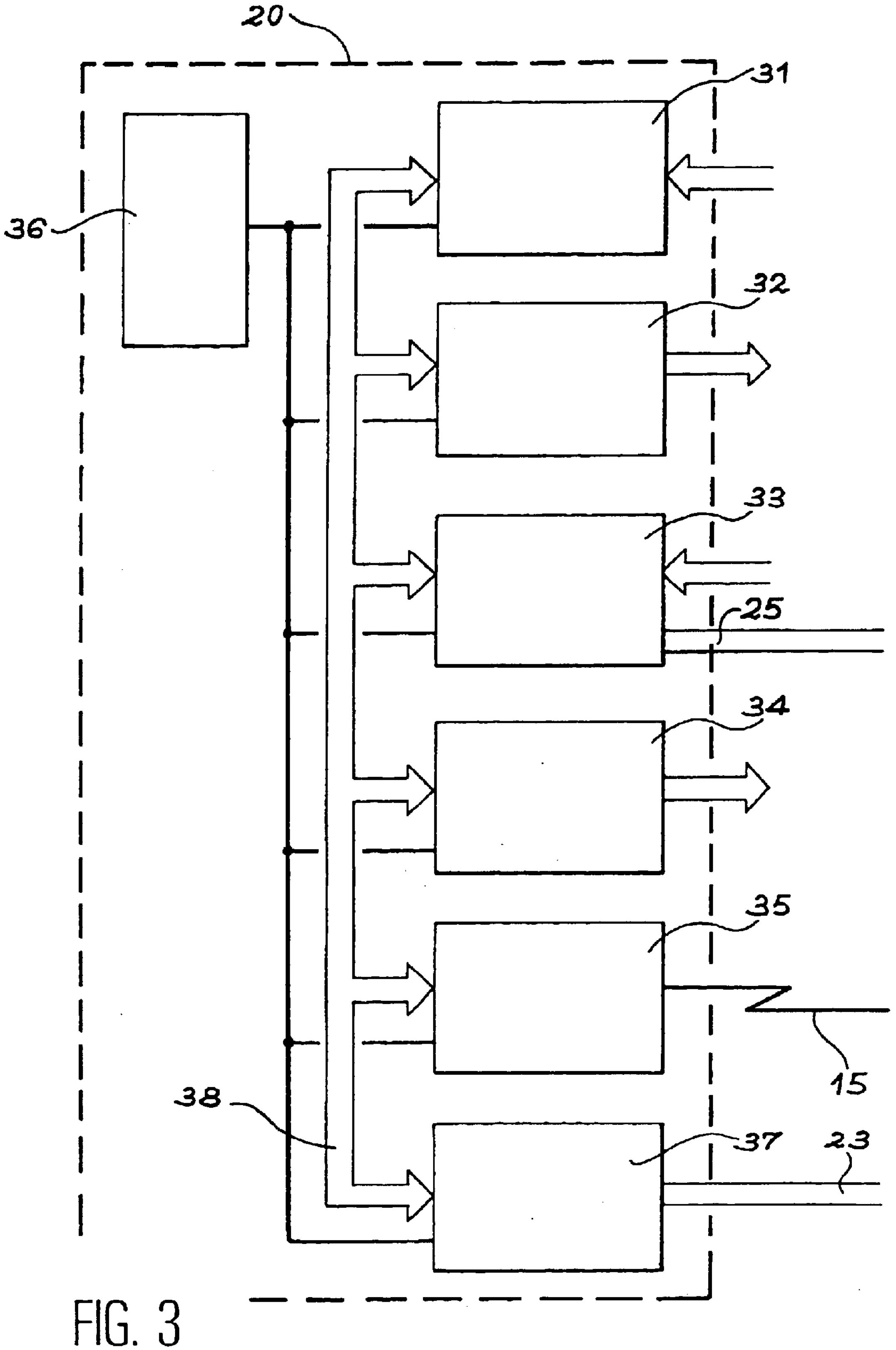
FIG. 3 is a block diagram of the interface shown in FIG. 2, which in the described case has several electronic cards installed in a bay.

FIG. 3 illustrates the system 20 showing the various electronic interface cards respectively having discreet inputs 31, discreet outputs 32, analog inputs 33 (connected to the flexible printed circuit 25), analog outputs 34, the interface 35 (connected to a data series transmission line 15) and bus processor management interface card 37 (connected to the flexible printed circuit 23), as well as double line arrows 38 representing the information flow between these various cards. It also shows the power supply card 36 supplying the necessary voltages to the interfaces 31, 32, 33, 34, 35 and 37, as well as to the module 21 via the flexible printed circuits 23 and 25.

FIG. 4A shows a microcontroller 40, a quartz 41 and a bypass capacitor 42, installed on a printed circuit 24 and connected by a flexible printed circuit 23 to the interface card 33 illustrated in FIG. 3. The watch quartz 41 and supply bypass capacitor 42 must be connected as close as possible to the microcontroller 40.

FIG. 4B shows an analog/digital converter 43, a bypass capacitor 44 and an external voltage reference 45, installed on a printed circuit 26 and connected by a flexible printed circuit 25 to the interface card 37 illustrated in FIG. 3. The voltage reference circuit 45 and supply bypass capacitor 44 must be connected as close as possible to the analog/digital converter 43.

Figure 5A:
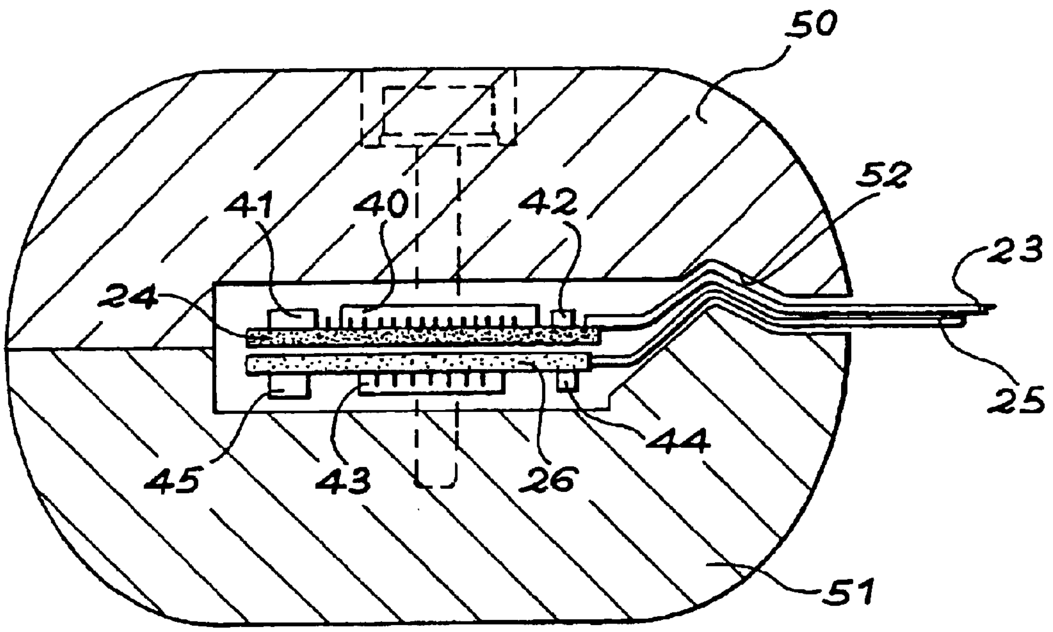
FIGS. 5A and 5B show two sectional views of the shield, revealing the group of first components illustrated in FIGS. 4A and 4B.
Figure 5B:
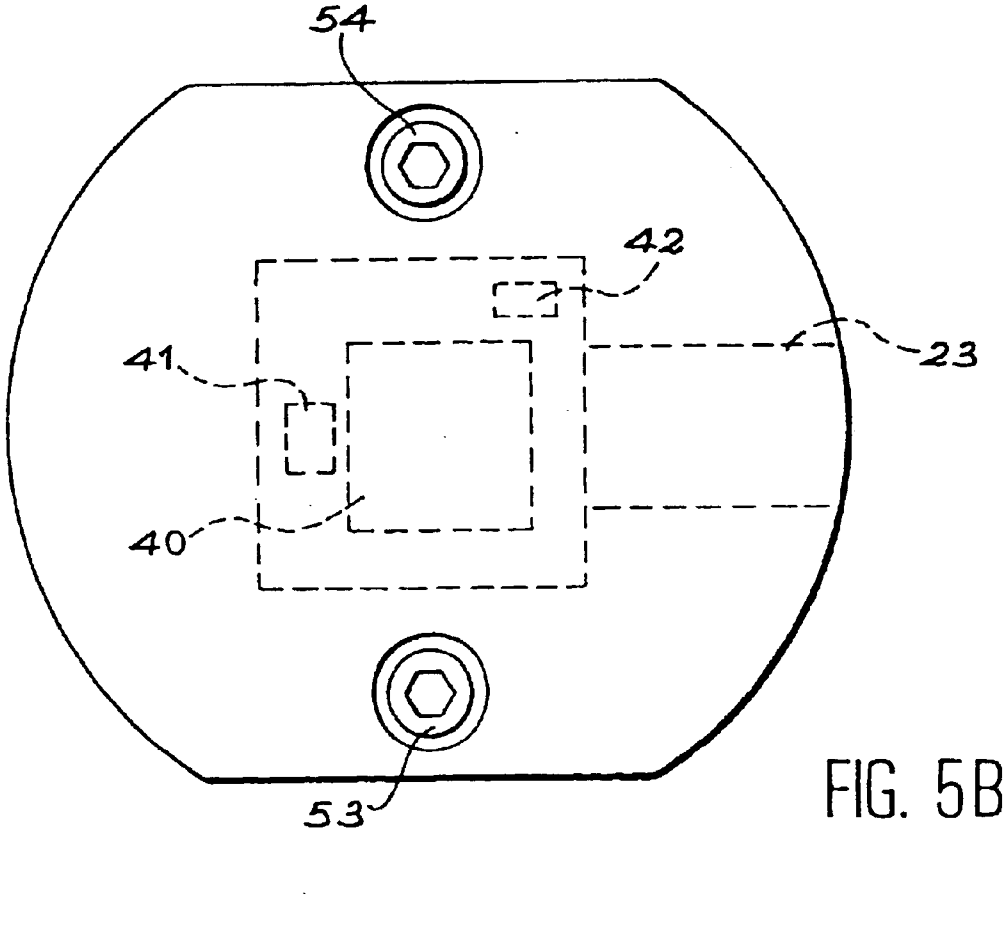

FIGS. 5A and 5B show an example of the implementation of the shield 22 constituted by two half-shells 50 and 51 ensuring the protection of the components 40, 41, 42, 43, 44, 45. These two half-shells constitute a shield, which it is aimed here to make isotropic in order to attenuate gamma rays. The passage of the flexible printed circuits 23 and 25, input/output of the shield, has a baffle 52 preventing the radiation from directly reaching said components. FIG. 5B is a diagrammatic plan view of the two half-shells 50, 51, secured to one another by screws 53, 54.

Figure 6:
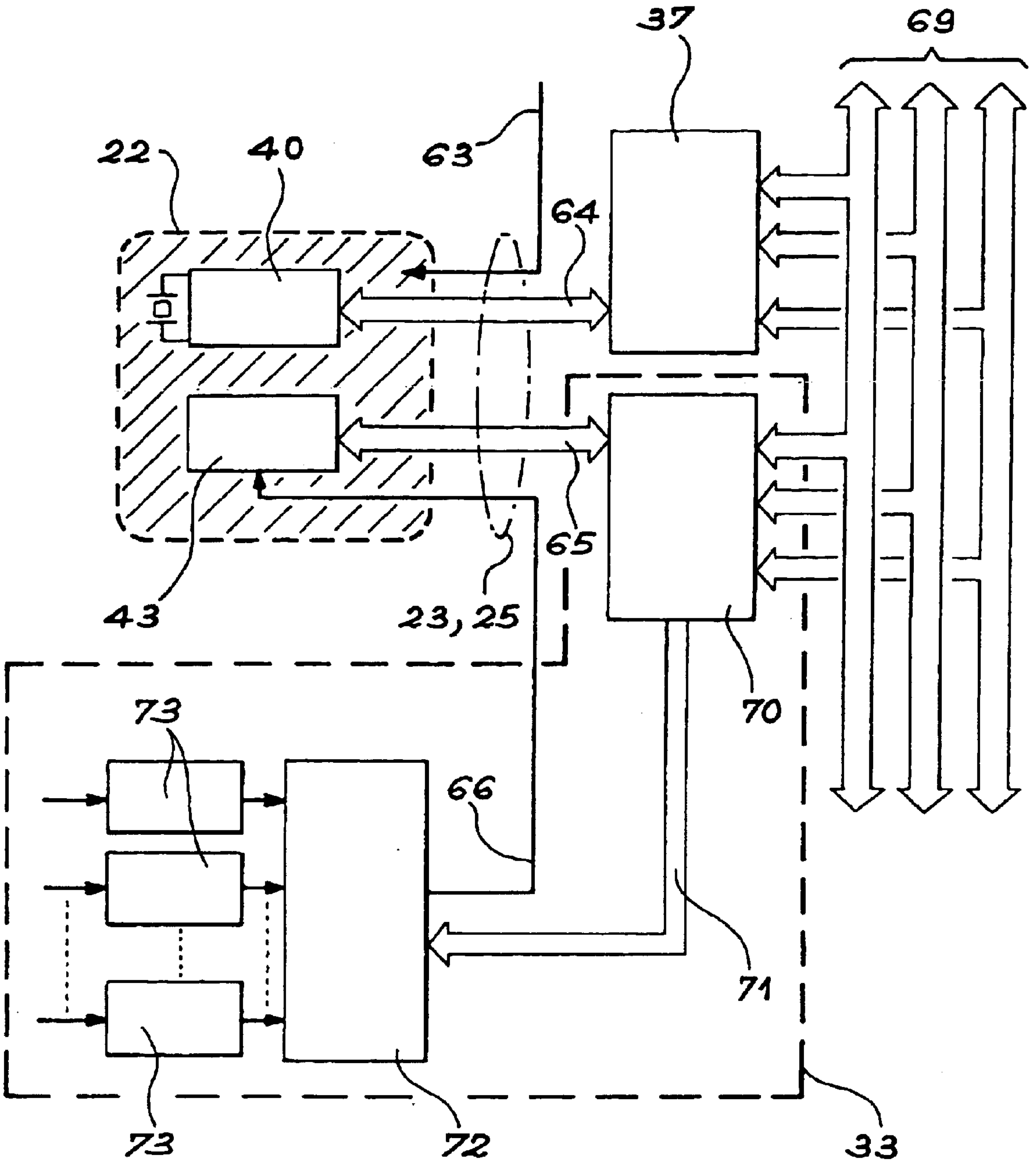
FIG. 6 diagrammatically shows the information exchanges between the components selectively protected in the shield 22 and the remainder of the system, via interface cards 33 and 37.

FIG. 6 operationally illustrates the information exchanges between the components selectively protected in the shield 22 and the remainder of the system, via the interface cards 33, 37.

The microcontroller 40 and analog/digital converter 43 are installed on the specific printed circuits 24 and 26. They are connected to interfaces belonging to the second group of components by flexible printed circuits 23 and 25 carrying:

- supplies 63,
- address and data buses 64 of the microcontroller 40,
- control and data signals 65 of the converter 43,
- the analog input signal 66 of the converter 43.

A logic system, installed on the interface card 37, relays data, address and control signals in accordance with a conventional diagram, via a conventional processor bus 38 (motherboard).

To said bus 38 is connected the data exchange and address decoding logic 70, which controls the selection logic of one input among N of an analog multiplexer 72 of the N:1 type, connected to N analog inputs via preamplifiers/conditioners 73, all known to be resistant. Via the processor bus 38 and control logic 70, the microcontroller program 40 successively controls the conversion of analog input signals by successive selection thereof by means of the multiplexer 72 and then recovers the result of said analog/digital conversion via the same control logic 70 and processor bus 38.

FIGS. 7A and 7B show a mechanical embodiment of the invention. On a rack 90 in the form of a metal plate, is fixed a conventional frame 91 constituting the physical support of the system 20 and having a motherboard 92, whose printed circuit carries the signals of the bus 38, as well as analog lines acting on the conditioners 73 and supply lines from the card 36. To the motherboard 92 are connected the management interface cards 37 of the processor bus, the card 33 comprising the analog multiplexing means 70 to 73 and the other cards 31, 32, 34, 35, 36 not shown in the drawing. The cards 95 are not shown, motor control cards.

The shield 22 is formed by a tight of hollowed out, Dénal sphere 100 constituted by two half-shells 50 and 51 from which emerge flexible printed circuits 23, 25 connected to cards 33, 37. This sphere 100 is held by two elastomer cores 98, joined by a hollowed out plate 96 and four small columns 97. The selected elastomer is polyurethane.

Thus, the sphere 100 is placed on a first elastomer core 98, whose internal radius is chosen in such a way that it does not come into contact with the bearing or support plane of said first core 98, even with maximum crushing. A second identical core 98 is placed above the sphere 100. These two cores ensure the suspension mainly along the vertical axis. In order to also ensure the suspension in the two other orthogonal directions, two other sets of cores can be added along these axes.

This absorber system maintains the assembly on the rack 90, whilst ensuring the damping of the movements of the sphere 100 in the case of an impact (e.g. in the case of dropping) or vibrations in the direction perpendicular to the plane of the rack 90.

Thus, this construction ensures, within predetermined acceleration limits, that the mass of the sphere does not transmit to the rack 90 and to the frame forces endangering the mechanical integrity of the assembly.

FIG. 8 places the control system according to the invention in the overall context of its use for controlling a mobile robot or a teleoperation device. The diagram represents a complete control system, subdivided into two assemblies:

- a unit 10 located in the immediate vicinity of the robot 11 and exposed to the radiation flux (irradiated environment 12),
- a computer 13 in contact with the operator 14 and located in a non-hostile environment.

Said unit 10 and said computer 13 are interconnected by a rapid, data transmission link 15.

Unit 10 cyclically ensures:

- scanning the different sensors of the robot (position, speed, force return),
- the dispatch of data from the sensors to the computer 13,
- the reception of directives calculated by the computer 13,
- the transmission for the implementation of these directives to the electronic power modules connected to the robot actuators (motors).

In addition, reflex actions are expected of the unit 10, such as emergency stoppage in the case of abnormalities, such as excess current consumed by a motor, or degraded or autonomous operating modes. The implementation of such functionalities, which are known to the expert, does not form part of the invention.

In more general terms, the invention is applicable to any electronic system having to operate under irradiation. Other than controls, these systems can include intelligent sensors or remote transmission systems.

BIBLIOGRAPHIC REFERENCES

[1] FR-A-2 765 342 (CEA)

[2] FR-A-2 764 713 (CEA)

[3] Article in the "Los Angeles Times" entitled "The Cutting Edge" (Mar. 13, 1998)

[4] "A Designer's/User's Guide for the Nuclear Power Industry" (Radiation, Effects on Electronic Equipment, Atomic Energy Authority (UK), AEA-D&W-0691, document 200, page 8, document 800 pages 9 to 14)

[5] "The Effects of Radiation on Electronic Systems" by Georges C. Messenger and Miklton S. Ash (second edition, FIG. 15-13, page 881)

What is claimed is:

1. Process for designing an electronic system able to operate under X or gamma radiation comprising the following stages:

I. Enumerating all the function to be implemented by the system;

II. determining electronic components able to physically implement these functions whilst giving preference to models having the larger scale integration;

III. determining the volume of components which can be protected by protection means referred to as shielding, whilst taking account of a radiation dose to be withstood by the system, the maximum permitted weight of the material chosen for said shielding, as well as the distance at which components selectively protected by said shielding could be from other, unshielded components;

IV. establishing a list of the most vulnerable components, whilst firstly taking account of their technology, then their degree of integration, whilst associating with each of these components the components which have to be installed in their immediate vicinity, if existing, and whilst firstly positioning the most vulnerable component, then that whose vulnerability is slightly less high and so on, optionally including identical vulnerability circuits;

V. selecting on the basis of the list of the preceding stage, a group of components, commencing with the most vulnerable components and limiting said group to components which, by their very dimensions, can be installed in the volume defined in stage III;

VI. examining whether the components in said system can implement coherent functions and only communicate with the remainder of the system by connection means which transmit signals able to pass through without deterioration the distance stipulated in stage III between the selectively protected components and the other components; if all these conditions are not simultaneously fulfilled, modifying by iteration the list of components in order to obtain this result, but without exceeding the volume defined in stage III; if all these conditions are simultaneously fulfilled pass to the following stage, the group of components obtained in this way being called the "first group of first components" and the other components being called the "second group of second components";

VII. designing the physical installation of the first group of first components, designing the shielding, constituted by at least one radiation-absorbing material, positioned around said first group of components, and designing between the first group of components and the second, connection means arranged so as not to form a penetration path for ambient radiation;

VIII. designing the physical installation of the second group of components, evaluating the radiation dose which they have to withstand and, if necessary, using a complimentary procedure for improving their suitability for operating under irradiation by a technique other than shielding;

IX. evaluating whether the solution to the set problem is in fact obtained; if it is not obtained, modifying the parameters of stage III and repeating the process as from stage III.

2. Process according to claim 1, comprising a subsequent stage:

X. validating the design by producing a prototype in accordance with the preceding design stages, at least with regards to the first group of components, installed and fitted in its protection means, and performing irradiation tests; if said tests are not in accordance with the specifications, the parameters of stage III are modified and the procedure is repeated as from stage III.

3. Application of the process according to claim 1 to an electronic system comprising:

a first group of first components incorporating components which are vulnerable to said radiation, and associated elements which have to be installed in their immediate vicinity, a shield of metal in which is defined a volume available for protection against said radiation, wherein said first components are situated in said shield, a second group of second components, which may withstand said radiation longer than the first and which are not protected by shielding, and a flexible printed circuit for connecting the two groups of electronic components, said flexible printed circuit along a baffle provided at the input/output of the shield to avoid forming a penetration path for said radiation.

4. System according to claim 3, wherein the shield (22) is constituted by two half-shells (50, 51) protecting said components (40, 41, 42, 43, 44, 45).

5. System according to claim 3, wherein the first group (21) of first components also incorporates at least one microcontroller (40) located within the shield (22).

6. System according to claim 3, wherein the first components located within the shield (22) are connected to an interface card (20) by the flexible printed circuit (23).

7. System according to claim 3, wherein the first group (21) of first components comprises a microcontroller (40) and an analog/digital converter (43) located within the shield (22) and connected to inter-faces, across the baffle in the shield, via flexible integrated circuits carrying:

a multiplexed bus (64) belonging to the microcontroller (40), control and data signals (65) belonging to the converter (43), the analog input signal (66) of the converter (43).

8. System according to claim 3, wherein the first group (21) of first components is mechanically connected to the remainder of the system by a mechanical suspension (96, 97, 98).

9. System according to claim 8, wherein said mechanical suspension is ensured by elastomer cores (98).

10. System according to any one of the claims 3 to 9, wherein between the first group of first components and the shield is incorporated an electrically insulating, but thermally conductive product, in order to remove via the shield the heat generated by the operation of the electronic components.

11. Application of the process according to claim 1 to the electronic control of a mobile robot.

* * * * *